(12) United States Patent
Bharath et al.

(10) Patent No.: US 9,372,890 B2
(45) Date of Patent: Jun. 21, 2016

(54) METHODS, SYSTEMS, AND COMPUTER-READABLE MEDIA FOR PROVIDING A QUERY LAYER FOR CLOUD DATABASES

(75) Inventors: S/shri. V. Bharath, Hyderabad (IN); Satyanarayana R. Valluri, Hyderabad (IN); Kamalakar Karlapalem, Hyderabad (IN); Radha Krishna Pisipati, Hyderabad (IN)

(73) Assignee: Infosys Technologies, Ltd., Bangalore (IN)

( * ) Notice: Subject to any disclaimer, the term of this patent is extended or adjusted under 35 U.S.C. 154(b) by 0 days.

(21) Appl. No.: 13/304,043

(22) Filed: Nov. 23, 2011

(65) Prior Publication Data
US 2013/0132371 A1 May 23, 2013

(51) Int. Cl.
*G06F 17/30* (2006.01)
(52) U.S. Cl.
CPC ................................ *G06F 17/30463* (2013.01)
(58) Field of Classification Search
USPC ......................................... 707/759, 760, 763
See application file for complete search history.

(56) References Cited

U.S. PATENT DOCUMENTS

| 6,366,901 | B1* | 4/2002 | Ellis ........................ G06F 17/30 |
| 2003/0093410 | A1* | 5/2003 | Couch .............. G06F 17/30554 |
| 2004/0117359 | A1* | 6/2004 | Snodgrass et al. ................ 707/3 |
| 2011/0258179 | A1* | 10/2011 | Weissman et al. ............ 707/714 |
| 2011/0302583 | A1* | 12/2011 | Abadi et al. ................... 718/102 |
| 2012/0089612 | A1* | 4/2012 | Collins .............. H04N 1/00244 707/747 |
| 2012/0173515 | A1* | 7/2012 | Jeong et al. .................... 707/718 |

OTHER PUBLICATIONS

Gruenheid et al., "Query Optimization Using Column Statistics in Hive", Sep. 21-23, 2011, all pages.*
Thusoo et al., "Hive—A Warehousing Solution Over a Map-Reduce Framework," VLDB '09, pp. 1626-1629 (Aug. 24-28, 2009).

* cited by examiner

*Primary Examiner* — Son T Hoang
(74) *Attorney, Agent, or Firm* — LeClairRyan, A Professional Corporation

(57) ABSTRACT

A method, non-transitory computer readable medium, and apparatus for receiving data from a cloud database. One or more queries requesting data from the cloud database are received. The one or more queries are converted from a row-store database query into a column-store database query. An optimal join plan is identified for the one or more queries using a cost based optimizer based on metadata for one or more relations in the cloud database. The optimal join plan is executed using a cloud application programming interface.

15 Claims, 3 Drawing Sheets

METHODS, SYSTEMS, AND COMPUTER-READABLE MEDIA FOR PROVIDING A QUERY LAYER FOR CLOUD DATABASES

FIELD OF THE INVENTION

The present invention relates to cloud databases. More particularly, it is concerned about computer-implemented methods, systems and computer-readable media for providing a query layer for cloud databases.

BACKGROUND OF THE INVENTION

Data warehousing applications involve processing of terabytes of data, most of the queries involving complex joins. To solve these problems involving large amounts of data, Google has come up with the notion of Map-reduce and also distributed storage architecture called "Big Table". Apache released the open-source implementations of both of these ideas (Hadoop and HBase). Also Apache started a data warehousing application called Hive as a subproject of Hadoop.

The existing technology mostly addresses traditional relational databases which follow row-store. However, cloud databases which are relational nature follow column-store. Few organizations like Amazon provide APIs to interact with the cloud data. Most of these APIs are specific to their own cloud databases, but not provide a generic APIs to interact with them. For example, Hadoop provides its own syntax which differs from the syntax from Amazon EC2. On the other hand, they are mostly focuses on inserting data, rather than providing an SQL kind of interface to retrieve the data.

As cloud computing is a new area, there may be several works, at initial stages. Some of the products/tools/software related to some extent of this invention are Hive, Pig and JAQL.

Hive is a data warehouse infrastructure built on top of Hadoop that provides tools to enable easy data summarization, adhoc querying and analysis of large datasets data stored in Hadoop files. It provides a mechanism to put structure on this data and it also provides a simple query language called Hive QL which is based on SQL and which enables users familiar with SQL to query this data. At the same time, this language also allows traditional map/reduce programmers to be able to plug in their custom mappers and reducers to do more sophisticated analysis which may not be supported by the built-in capabilities of the language. Hive doesn't explore the advantages of column-oriented data stores and also doesn't have a cost-based query optimizer.

Pig is a platform for analyzing large data sets that consists of a high-level language for expressing data analysis programs, coupled with infrastructure for evaluating these programs. The salient property of Pig programs is that their structure is amenable to substantial parallelization, which in turns enables them to handle very large data sets.

At the present time, Pig's infrastructure layer consists of a compiler that produces sequences of Map-Reduce programs, for which large-scale parallel implementations already exist (e.g., the Hadoop subproject). Pig's language layer currently consists of a textual language called Pig Latin, which has the following key properties such as Ease of programming, Optimization opportunities and Extensibility.

Ease of programming: It is trivial to achieve parallel execution of simple, "embarrassingly parallel" data analysis tasks. Complex tasks comprised of multiple interrelated data transformations are explicitly encoded as data flow sequences, making them easy to write, understand, and maintain.

Optimization opportunities: The way in which tasks are encoded permits the system to optimize their execution automatically, allowing the user to focus on semantics rather than efficiency.

Extensibility: Users can create their own functions to do special-purpose processing.

JAQL is a query language for JavaScript Object Notation or JSON. Although JAQL has been designed specifically for JSON, have tried to borrow some of the best features of SQL, XQuery, LISP, and PigLatin. JAQL is a functional query language that provides users with a simple, declarative syntax to do things like filter, join, and group JSON data. JAQL also allows user-defined functions to be written and used in expressions. Their high-level design objectives include are Semi-structured analytics, Parallelism and Extensibility.

Semi-structured analytics: easy manipulation and analysis of JSON data.

Parallelism: JAQL queries that process large amounts of data must be able to take advantage of scaled-out architectures.

Extensibility: users must be able to easily extend JAQL.

The limitations of the existing technology are such that no open standard for cloud data interfaces. So, if the cloud infrastructure is using differing libraries to interact, code need to be re-written to each of the library separately. So, hosting an existing enterprise-based application over cloud has to take place again a complete software development life cycle. Similar challenges arise when migrate data from one cloud to the other. This task is not only time consuming and costly, but it also introduces new bugs and troubles as the developer may not be well equipped to use write API's for each of the cloud the user needs to access.

Thus, there is a need to overcome the problems of the existing technology. Therefore, the present inventors have developed computer-implemented methods, systems and computer-readable media for providing a query layer for cloud databases which would propose using one common implementation interface which is a modified version of Structured Query Language (SQL) to interact in a platform independent manner, thus make it more generic in nature. It also builds efficient cost based optimizer that reduces the number of selection and join operations over column-store databases.

SUMMARY OF THE INVENTION

The present invention discloses a computer implemented method executed by one or more computing devices to provide a query layer for cloud databases. The method comprises importing data into said cloud by at least one of the computing devices, converting at least one of the queries over row-store database into a query over column-store database by means of cost based query optimizer and retrieving said data from said column-store database based on said query by at least one of the computing devices.

The present invention further discloses a system for providing a query layer for cloud databases. The system comprises a memory, and a processor operatively coupled to the memory. The processor configured to perform the steps of importing data into said cloud by at least one of the computing devices, converting at least one of the queries over row-store database into a query over column-store database by means of cost based query optimizer, and retrieving said data from said column-store database based on said query by at least one of the computing devices.

Additionally, the present invention discloses a Computer-readable code stored on a non-transitory computer-readable medium that when executed by a computing device performs a method for providing a query layer for cloud databases. The method comprises importing data into said cloud by at least one of the computing devices, converting at least one of the queries over row-store database into a query over column-store database by means of cost based query optimizer, and retrieving said data from said column-store database based on said query by at least one of the computing devices.

While systems and methods are described herein by way of example and embodiments, those skilled in the art recognize that systems and methods for providing a query layer for cloud databases are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE INVENTION

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

Disclosed embodiments provide computer-implemented methods, systems, and computer-readable media for providing a query layer for cloud databases.

Figure 1:
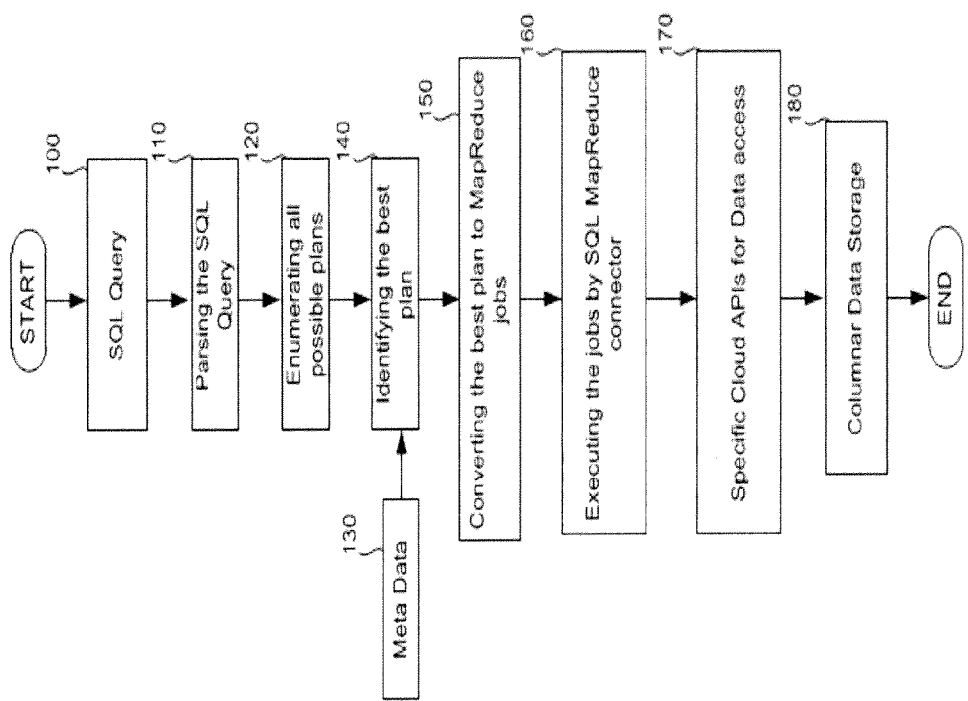
FIG. 1 illustrates a flowchart of SQL interface to Cloud.

FIG. 1 shows a flowchart of SQL interface (100) to Cloud. The method steps for providing a query layer for cloud databases includes a SQL query (100), parsing the SQL query (110), Enumerating all possible plans (120), Identifying the best plan (140) based on the metadata (130), Converting the best plan into a set of MapReduce jobs (150), executing the jobs by using SqlMapReduce connector (160), specific cloud APIs for data access (170) and columnar data storage (180).

Parsing the SQL query (110) and retrieves the columns, join conditions and this information will be used in the optimizer depending on the join conditions by the use of Parser.

Enumerating all possible plans (120) for a given query based on the join conditions by the Plan Enumerator.

Identifying the best plan (140) to execute depending on the collected meta-data (130) by the best Plan Selector and sends it to the executor.

Converting the best plan into a set of MapReduce jobs (150) by the Plan Executor.

Executing those jobs (160) on the cluster using SQL MapReduce connector and the Cloud API. The specific cloud APIs are used for data access and stores on columnar data storage (180).

Plan Enumeration: first, list out all possible ways of joining the input tables from the given SQL query and then calculate the possible costs using the cost models. Later, sort the above joins in an increasing order of total joining costs and choose the top plan as the best one to execute.

Join Algorithm:

Join requires multiple maps and multiple reducers.

Map phase emits: <column value to be joined, corresponding row key>

In the reduce phase all the keys with same column value corresponding to both the tables can be found in a single reducer and do nested loop join in each reducer and collect the output.

Example (Joining two tables t1, t2):

| Key1 | Val1 | Key2 | Val2 |
|------|------|------|------|
| A    | 1    | P    | 1    |
| B    | 1    | Q    | 2    |
| C    | 2    | R    | 2    |

| Map phase | Shuffle Phase | Reduce Phase |
|-----------|---------------|--------------|
| <1, A_t1> | <1, <A_t1, B_t1, P_t2>> | NestedLoopJoin |
| <1, B_t1> | <2, <C_t1, Q_t2, R_t2>> | |
| <2, C_t1> | | |
| <1, P_t2> | | |
| <2, Q_t2> | | |
| <2, R_t2> | | |

Query Optimizations on Cloud: Column-oriented databases such as HBase are often compared to more traditional and popular relational databases (RDBMSs). Although they differ in their implementations and in what they set out to accomplish, the comparison is a fair one to make. Typical RDBMSs are fixed-schema, row-oriented databases with ACID (Atomicity, Consistency, Isolation and Durability) properties and a sophisticated SQL query engine. The emphasis is on strong consistency, referential integrity, abstraction from the physical layer, and complex queries through the SQL language. One can easily create secondary indexes, perform complex inner and outer joins, count, sum, sort, group, and page your data across a number of tables, rows, and columns. However, if there is a need to scale up in terms of dataset size, read/write concurrency, or both, then the conveniences of an RDBMS come at an enormous performance penalty and make distribution difficult. The scaling of an RDBMS usually involves loosening ACID restrictions and this is how Column-Oriented databases are designed.

In the present invention, developed a SQL like query interface Layer to process SQL Select Queries with a cost-based optimizer and use the MapReduce framework to implement the algorithms to build this SQL Layer.

The present invention provides a computer implemented method executed by one or more computing devices to provide a query layer for cloud databases. The method comprises importing, by at least one of the computing devices, data into the cloud. Converting at least one of the queries over row-store database into a query over column-store database by means of cost based query optimizer. Retrieving, by at least one of the computing devices, the data from the column-store database based on the query.

The present invention provides an SQL system that uses the storage and scaling capabilities of cloud. The method provided supports importing current relational data on to the cloud. The system provided has a join cost based optimizer which can execute the SQL queries more efficiently by dynamic selection of early and late materialization of tuples. The system provided accesses Column store databases of Cloud, transform the SQL query over row-store data into an equivalent query over column-store data which is of type key-value storage in order to retrieve the data from cloud databases.

The present invention uses one common implementation interface which is a modified version of Structured Query Language (SQL) to interact in a platform independent manner, thus make it more generic in nature. A platform neutral SQL query interface to retrieve the data from cloud which allows hosting of existing applications seamlessly on to the cloud.

Figure 2:
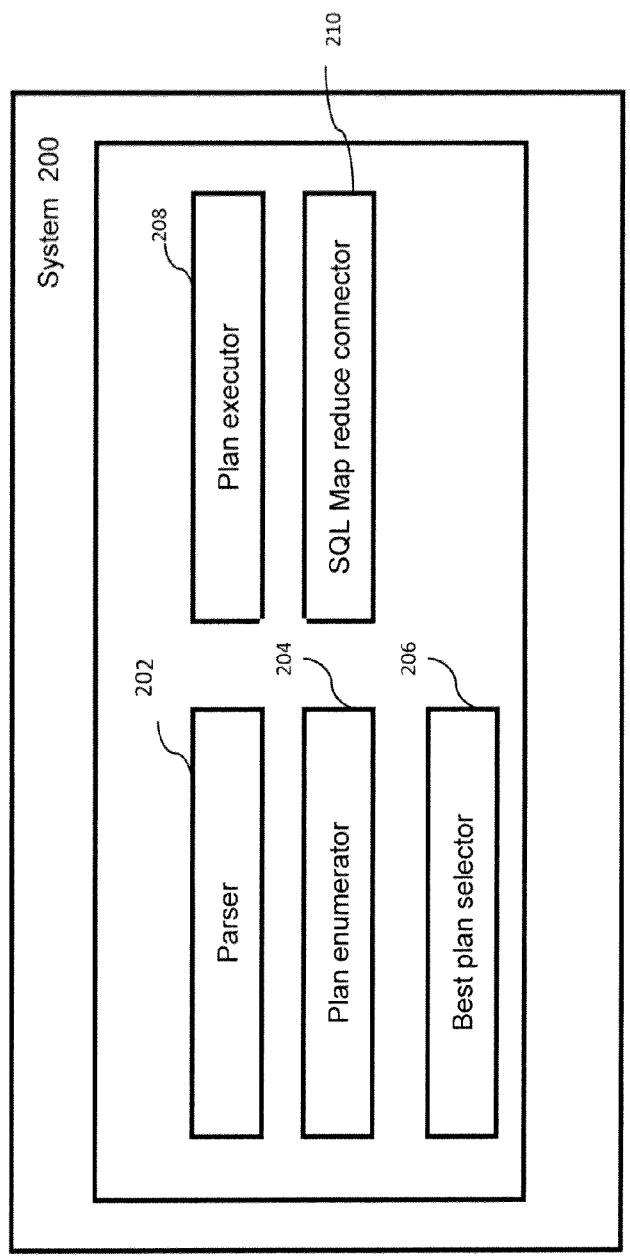
FIG. 2 illustrates a block diagram, illustrating a system for identifying one or more components, in accordance with an embodiment of the present invention.

FIG. 2 is a block diagram, illustrating a system 200 for identifying one or more components, in accordance with an embodiment of the present invention. More particularly, in FIG. 2 the system includes a parser 202, a plan enumerator 204, best plan selector 206, plan executor 208 and a SQL MapReduce connector 210.

The Parser 202 module parses the SQL query and retrieves the columns, join conditions and this information will be used in the optimizer depending on the join conditions. The Plan Enumerator 204 module enumerates all possible plans for a given query based on the join conditions. The Best Plan Selector 206 module identifies the best plan to execute depending on the collected meta-data and sends it to the executor. The Plan Executor 208 module converts the best plan into a set of MapReduce jobs and executes those jobs on the cluster using the Cloud API and SQL MapReduce connector 210.

The present invention also builds efficient cost based optimizer that reduces the number of selection and join operations over column-store databases. The approach of building query optimizer by materializing tuples is new with respect to present technologies. This is a novel attempt which use join cost algorithm. The query optimizer computes the best way of joining 'n' relations in cloud databases among all possible permutations using dynamic programming algorithm. It provides MapReduceSQL features such as select, aggregation operators, join and groupBy. It allows standard SQL qeries. It allows importing any MySqltable into Cloud database, ex. Hbase. It takes care about the conversion of the schema. It is built with improved cost algorithm by using regional histograms more effectively. It implements a modified version of join algorithm customized to exploit the cloud infrastructure.

SQL features such as select and join are described. For implementing "select" requires only map-phase and no reduce phases. A map phase is initiated on each region of data and the select condition is applied. Those tuples which satisfy the condition are filtered and written into an intermediate table. Cost of this operation is O(d/N) where 'd'—number of pages in the relation and 'N'—number of region servers. Instead of running separate MapReduce jobs for "Select" query, our package now combines it with the join phase and implements all the conditions while scanning the table for the join. This greatly reduces the run-time.

Join: Join requires multiple maps and multiple reducers. Map phase emits <column value to be joined, corresponding row key>. In the reduce phase all the keys corresponding to both the tables can be found in a single reducer and do a simple nested loop join in each reducer and collect the output.

Cost formula for Join: The cost formula to compute the join cost of two relations. To do that collecting some meta-data about the relations such as total number of tuples, number of distinct values of column to be joined a histogram for each region which maps each distinct value to its number of occurrences.

Suppose joining two relations A (N1) and B (N2) containing d1 and d2 distinct values respectively in the join column. Consider d1<d2 without loss of generality.

Cost of Map phase: because map phase requires the scan of both relations once on 'n' region servers, its cost is $O((N1+N2)/n)$.

Cost of Shuffle phase: Shuffle phase scans both the relations once to allot the reducers. So its cost is $O(N1+N2)$.

Cost of Reduce phase: implementing the nested loop join on (N1/d1) tuples on r1 and (N2/d2) tuples of r2, for which the cost is $O(N1/d1*N2/d2)$. There can be at max d1/n sequential reduce phases. So total reduce cost is $O(N1*N2/n*d2)$.

Total join cost is $O(((N1+N2)/n)+(N1+N2)+(N1*N2)/n*d2)$. To derive the cost formula, assumed uniform distribution of data.

Optimizer: The cost based optimizer using the metadata stored about the data for cloud databases that are Column-Oriented. It uses the cost formulae of join, select etc., and uses a dynamic programming approach and gives out a best plan for joining a set of tables and also implemented Aggregation operators and multi-join where one can do the entire join in a single map-reduce phase. Ex: select * from A, B, C where A.a=B.b and B.b=C.c;

There is a need to select for each join in the way of materialization. This can be decided by expecting (calculations using meta-data) the number of rows in the output table and its distribution beforehand.

The present invention is also implemented the code which can import any MySql table into Hbase. It takes care about the conversion of the schema. Also implemented a simple query which can select the best way of joining 'n' relations among all possible permutations.

Test Bed description: This optimizer has been tested on hadoop+hbase.

Test Data: Inventors have used TPCH benchmark to generate data of various scales from 0.1 to 1 and generated ORDERS, CUSTOMERS, SUPPLIER tables of various scales.

Test Queries: Inventors fired various queries containing Selects, Projects and Joins on the above data scales.

Exemplary Computing Environment

Figure 3:
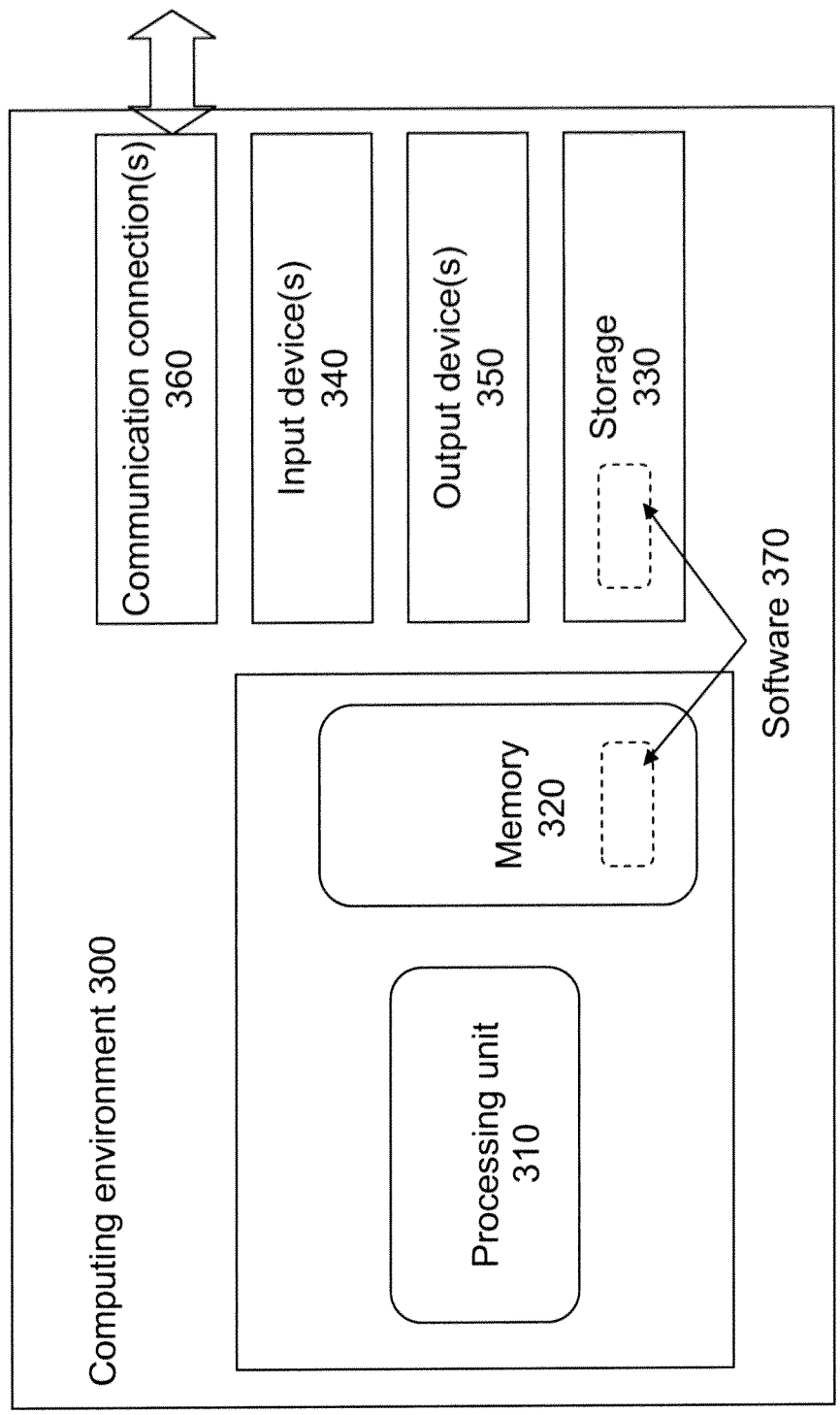
FIG. 3 illustrates a generalized computer network arrangement, in one embodiment of the present technique.

One or more of the above-described techniques may be implemented in or involve one or more computer systems. FIG. 3 shows a generalized example of a computing environment 300. The computing environment 300 is not intended to suggest any limitation as to scope of use or functionality of described embodiments.

With reference to FIG. 3, the computing environment 300 includes at least one processing unit 310 and memory 320. The processing unit 310 executes computer-executable instructions and may be a real or a virtual processor. In a multi-processing system, multiple processing units execute computer-executable instructions to increase processing power. The memory 320 may be volatile memory (e.g., registers, cache, RAM), non-volatile memory (e.g., ROM, EEPROM, flash memory, etc.), or some combination of the two. In some embodiments, the memory 320 stores software 370 implementing described techniques.

A computing environment may have additional features. For example, the computing environment 300 includes storage 330, one or more input devices 340, one or more output devices 350, and one or more communication connections 360. An interconnection mechanism (not shown) such as a bus, controller, or network interconnects the components of the computing environment 300. Typically, operating system software (not shown) provides an operating environment for other software executing in the computing environment 300, and coordinates activities of the components of the computing environment 300.

The storage 330 may be removable or non-removable, and includes magnetic disks, magnetic tapes or cassettes, CD-ROMs, CD-RWs, DVDs, or any other medium which may be used to store information and which may be accessed within the computing environment 300. In some embodiments, the storage 330 stores instructions for the software 370.

The input device(s) 340 may be a touch input device such as a keyboard, mouse, pen, trackball, touch screen, or game controller, a voice input device, a scanning device, a digital camera, or another device that provides input to the computing environment 300. The output device(s) 350 may be a display, printer, speaker, or another device that provides output from the computing environment 300.

The communication connection(s) 360 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 300, computer-readable media include memory 320, storage 330, communication media, and combinations of any of the above.

Advantages of the Invention

Provided a generic interface to store and access any cloud database.

To host enterprise applications on cloud seamlessly, without much re-writing applications.

To enable cloud analytics.

To migrate data from enterprise to cloud, cloud to enterprise and inter-cloud.

To store the data into cloud databases and query the information from columnar databases.

To perform range and aggregated queries, and join the tables.

To perform content or key-word search in cloud databases.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

We claim:

1. A method for providing a query layer for a cloud database, the method comprising:
    receiving, by a cloud database management device, one or more structured query language (SQL) queries requesting data from the cloud database;
    converting, by the cloud database management device, at least one of the received one or more SQL queries from a row-store database SQL query into a column-store database SQL query;
    identifying, by the cloud database management device, an optimal SQL join plan for the column-store database SQL query using a cost based optimizer based on metadata for one or more relations in the cloud database;
    converting the optimal SQL join plan into a set of MapReduce jobs;
    executing, by the cloud database management device, the MapReduce jobs using a platform independent cloud application programming interface and a MapReduce SQL connector; and
    receiving, by the cloud database management device, the requested data from the cloud database based on the column-store database SQL query.

2. The method of claim 1, wherein the data comprises relational data.

3. The method of claim 1, wherein the cost based optimizer comprises a join cost algorithm.

4. The method of claim 1, wherein the cost based optimizer comprises a dynamic programming algorithm.

5. The method of claim 1, wherein the cost based optimizer comprises an optimal materialization of a plurality of tuples.

6. An apparatus comprising:
    a memory; and
    a processor coupled to the memory, wherein the memory and the processor are implemented at least partially by hardware, the processor configured to execute programmed instructions stored in the memory comprising:
    receiving one or more structured query language (SQL) queries requesting data from the cloud database;
    converting at least one of the received one or more SQL queries from a row-store database SQL query into a column-store database SQL query;
    identifying an optimal SQL join plan for the column-store database SQL query using a cost based optimizer based on metadata for one or more relations in the cloud database;
    converting the optimal SQL join plan into a set of MapReduce jobs;
    executing the MapReduce jobs using a platform independent cloud application programming interface and a MapReduce SQL connector; and
    receiving the requested data from the cloud database based on the column-store database SQL query.

7. The apparatus of claim 6, wherein the data comprises relational data.

8. The apparatus of claim 6, wherein the cost based optimizer comprises a join cost algorithm.

9. The apparatus of claim 6, wherein the cost based optimizer comprises a dynamic programming algorithm.

10. The apparatus of claim 6, wherein the cost based optimizer comprises an optimal materialization of a plurality of tuples.

11. A non-transitory computer-readable medium having stored thereon instructions for providing a query layer for a cloud database comprising machine executable code which, when executed by a processor cause the processor to perform steps comprising:

receiving one or more structured query language (SQL) queries requesting data from the cloud database;

converting at least one of the received one or more SQL queries from a row-store database SQL query into a column-store database SQL query;

identifying an optimal SQL join plan for the column-store database SQL query using a cost based optimizer based on metadata for one or more relations in the cloud database;

converting the optimal SQL join plan into a set of MapReduce jobs;

executing the MapReduce jobs using a platform independent cloud application programming interface and a MapReduce SQL connector; and receiving the requested data from the cloud database based on the column-store database SQL query.

12. The medium of claim 11, wherein the data comprises relational data.

13. The medium of claim 11, wherein the cost based optimizer comprises a join cost algorithm.

14. The medium of claim 11, wherein the cost based optimizer comprises a dynamic programming algorithm.

15. The medium of claim 11, wherein the cost based optimizer comprises an optimal materialization of a plurality of tuples.

* * * * *